United States Patent
Kim et al.

(10) Patent No.: US 10,205,874 B2
(45) Date of Patent: Feb. 12, 2019

(54) WEARABLE DEVICE AND CONTROL METHOD THEREOF

(71) Applicant: Samsung Electronics Co., Ltd., Suwon-si, Gyeonggi-do (KR)

(72) Inventors: Dae-hyun Kim, Hwaseong-si (KR); Yong-jin Choi, Seoul (KR); Lae-kyoung Kim, Yongin-si (KR); Jin-hyuk Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/347,148

(22) Filed: Nov. 9, 2016

(65) Prior Publication Data

US 2017/0134645 A1  May 11, 2017

(30) Foreign Application Priority Data

Nov. 10, 2015  (KR) .......................... 10-2015-0157528

(51) Int. Cl.
*H04N 5/232* (2006.01)
*H04N 5/225* (2006.01)
(Continued)

(52) U.S. Cl.
CPC ......... *H04N 5/23222* (2013.01); *G06F 3/017* (2013.01); *G06F 3/0346* (2013.01); *H04N 5/2254* (2013.01); *H04N 5/23212* (2013.01); *H04N 5/23241* (2013.01); *H04N 5/23245* (2013.01); *H04N 5/23293* (2013.01); *H04N 5/23296* (2013.01)

(58) Field of Classification Search
CPC ............. H04N 5/23222; H04N 5/2254; H04N 5/23212; H04N 5/23241; H04N 5/23245; H04N 5/23293; H04N 5/23296; G06F 3/0346; G06F 3/017
See application file for complete search history.

(56) References Cited

U.S. PATENT DOCUMENTS

| | | | |
|---|---|---|---|
| 6,619,835 B2 * | 9/2003 | Kita | A44C 5/0015 368/10 |
| 8,983,539 B1 | 3/2015 | Kim et al. | |

(Continued)

FOREIGN PATENT DOCUMENTS

| | | |
|---|---|---|
| JP | 2004-072450 A | 3/2004 |
| JP | 3951280 B2 | 8/2007 |
| KR | 10-2015-0025445 A | 3/2015 |

OTHER PUBLICATIONS

LED watch with Built-in camera (Online material published on Feb. 3, 2013. Retrieved from https://helpingtutorial.blogspot.com/2013/02/concept-of-led-watch-with-built-in.html).*

*Primary Examiner* — Shahbaz Nazrul
(74) *Attorney, Agent, or Firm* — Jefferson IP Law, LLP

(57) ABSTRACT

A wearable device and a control method thereof is provided. The wearable device includes a display configured to display time information, a camera configured to photograph an image, a sensor configured to sense a user's motion, and a processor configured to analyze the user's motion based on a sensing value sensed by the sensor and to perform an image photographing if the user's motion satisfies an image photographing condition, thereby enabling the user to perform image photographing easily using the wearable device.

18 Claims, 14 Drawing Sheets

(51) Int. Cl.
*G06F 3/0346* (2013.01)
*G06F 3/01* (2006.01)

(56) References Cited

U.S. PATENT DOCUMENTS

| | | |
|---|---|---|
| 8,994,827 B2 | 3/2015 | Mistry et al. |
| 2006/0050982 A1* | 3/2006 | Grosvenor ............. G03B 17/18 382/255 |
| 2011/0205851 A1 | 8/2011 | Harris |
| 2012/0249409 A1 | 10/2012 | Toney et al. |
| 2013/0057713 A1* | 3/2013 | Khawand ............... H04N 5/232 348/208.1 |
| 2014/0160078 A1* | 6/2014 | Seo ........................ G06F 3/017 345/175 |
| 2014/0278229 A1* | 9/2014 | Hong ..................... A63B 71/06 702/160 |
| 2015/0003210 A1* | 1/2015 | Joung ................... G04G 17/00 368/10 |
| 2015/0009784 A1* | 1/2015 | Cho ....................... G04G 21/08 368/224 |
| 2015/0085621 A1* | 3/2015 | Hong ..................... G04G 21/00 368/10 |
| 2015/0181123 A1* | 6/2015 | Pacurariu ............. H04N 5/3454 348/208.2 |
| 2015/0332032 A1* | 11/2015 | Alameh .................. G06T 7/20 726/30 |
| 2015/0334274 A1* | 11/2015 | Alameh ............. H04N 5/23245 348/240.99 |
| 2015/0341536 A1* | 11/2015 | Huang ................. H04N 5/2328 348/208.2 |
| 2015/0362999 A1* | 12/2015 | Kim ....................... G06F 3/017 715/716 |
| 2016/0018900 A1* | 1/2016 | Tu ........................ G06F 1/3234 345/156 |
| 2016/0085266 A1* | 3/2016 | Lee ..................... H04N 5/2628 348/240.2 |
| 2016/0085286 A1* | 3/2016 | Zhou .................... G06F 1/1637 345/156 |
| 2017/0011210 A1* | 1/2017 | Cheong ................. H04W 12/06 |
| 2017/0090590 A1* | 3/2017 | Shimotono ............ G04G 21/00 |
| 2017/0237459 A1* | 8/2017 | Kim ....................... H04B 1/385 455/575.6 |
| 2017/0315620 A1* | 11/2017 | Johri ...................... G06F 3/017 |

\* cited by examiner

FIG. 8A
FIG. 8B
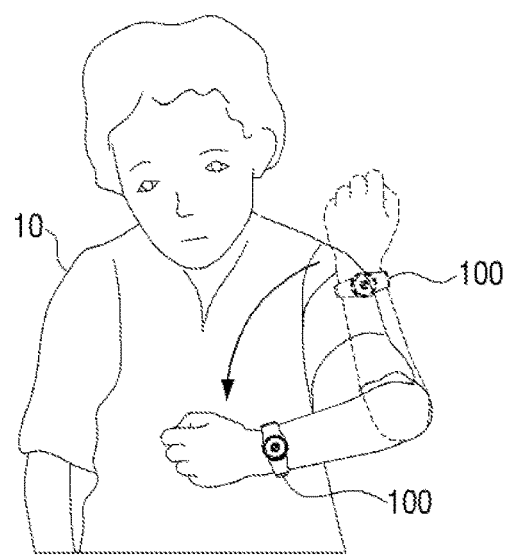
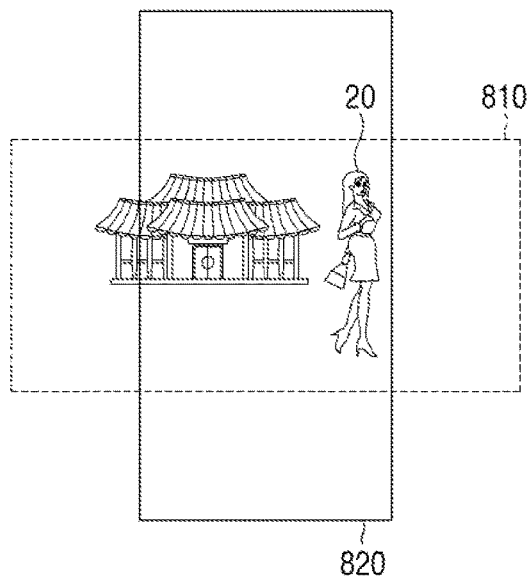

FIG. 9A
FIG. 9B
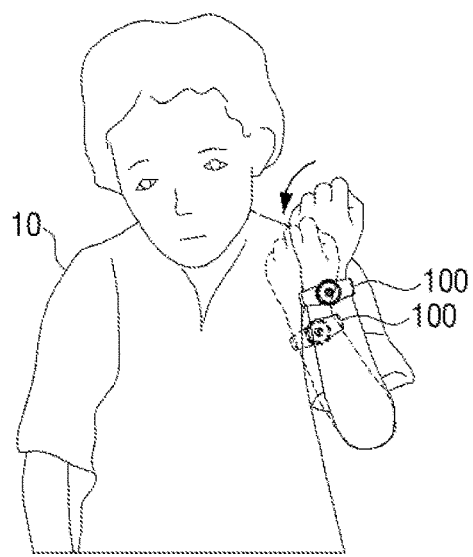
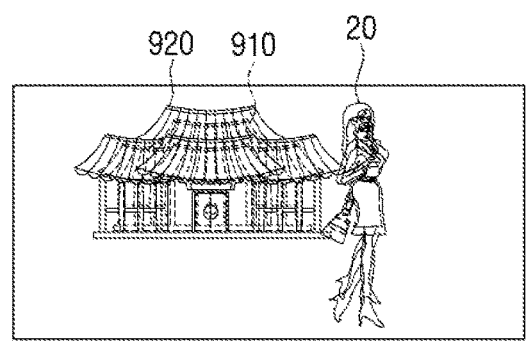

FIG. 10A
FIG. 10B
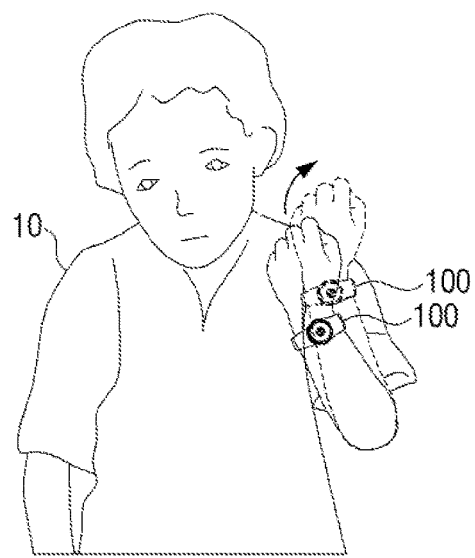
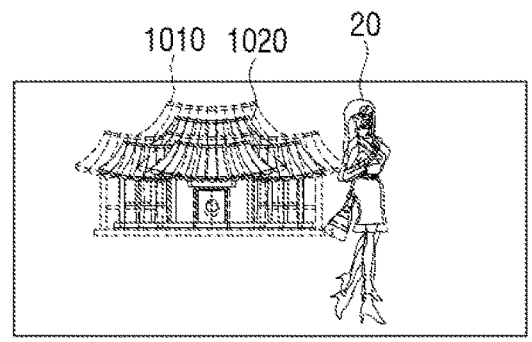

WEARABLE DEVICE AND CONTROL METHOD THEREOF

CROSS-REFERENCE TO RELATED APPLICATION(S)

This application claims the benefit under 35 U.S.C. § 119(a) of a Korean patent application filed on Nov. 10, 2015 in the Korean Intellectual Property Office and assigned Serial number 10-2015-0157528, the entire disclosure of which is hereby incorporated by reference.

TECHNICAL FIELD

The present disclosure relates to a wearable device and a control method thereof. More particularly, the present disclosure relates to a wearable device configured to photograph an image based on a user's motion, and a control method thereof.

BACKGROUND

As terminals such as personal computers, notebooks, mobile phones and the like are being provided with a variety of functions, multimedia devices equipped with multiple functions such as functions of photographing images, reproducing media files, games and the like are being developed.

Especially, recently, various services are being provided by interactions between multimedia devices. For example, smart watches that are interlocked with smart phones to provide various multimedia environments are being developed. Smart watches can not only provide time information but can also be interlocked with smart phones to provide various services and functions being provided from the smart phones.

However, smart watches have relatively less resources than electronic devices, such as smart phones, that have the resources needed to execute embedded software or operating systems (OS). Therefore, there are limitations to providing the various services and functions available in electronic devices through such smart watches.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wearable device capable of providing various services and functions.

Another aspect of the present disclosure is to enable photographing an image more easily and conveniently in relation to image photographing of the functions available in a wearable device.

In accordance with an aspect of the present disclosure, a wearable device is provided. The wearable device includes a display configured to display time information, a camera configured to photograph an image, a sensor configured to sense a first user's motion, and a processor configured to analyze the first user's motion based on a sensing value sensed by the sensor, and control the camera to photograph an image if the first user's motion satisfies an image photographing condition.

Further, the sensor may include a first sensor configured to sense an acceleration caused by the first user's motion, and a second sensor configured to sense an angular velocity caused by the first user's motion, wherein the image photographing condition includes an acceleration value sensed by the first sensor being equal to or greater than a predetermined critical velocity and an angular variation detected from the angular velocity sensed by the second sensor being equal to or greater than a predetermined critical value.

Further, the processor may control the camera to convert an operation mode of the camera to a standby mode if the acceleration value sensed by the first sensor is equal to or greater than the predetermined critical velocity, and the camera may perform auto focusing during the standby mode.

Further, the image photographing condition may further include a second user's motion not being sensed within a predetermined critical time after the first user's motion, and control the camera to determine a direction of movement of the second user's motion based on the acceleration value sensed by the first sensor and to perform a photographic operation based on the determined direction of movement if the second user's motion is sensed.

Further, the processor may control the camera to perform a zoom-in photographing operation if the direction of movement of the second user's motion is a first direction of approaching a subject to be photographed, and control the camera to perform a zoom-out photographing operation if the direction of movement of the second user's motion is a second direction of distancing away from the subject to be photographed.

Further, the processor may control the camera to perform a photographing operation related to screen conversion if the direction of movement of the second user's motion is a direction towards a ground.

Further, the camera may include a lens, and the lens may be located in a central region of the display.

Further, the wearable device may further include an input interface configured to receive input of a user command, wherein the input interface may include a bezel manipulator formed on a rim of the display, and a jog dial formed on one side surface of the display, and the processor may control the camera to perform a zoom-in/zoom-out photographing operation according to at least one manipulating direction of one of the bezel and the jog dial.

Further, the camera may move the lens or the display up and down according to a control command regarding the zoom-in/zoom-out photographing operation.

Further, the display may display at least one of the time information and a plurality of contents user interfaces (UIs) on a region of the display other than the central region where the lens is located.

Further, the wearable device may include a body that includes the display, the sensor, and the processor and a band that is physically connected with the body and configured to be wearable on a body part of the user, wherein the band may include one of a flexible display panel or a sub-display communicably connected to the body through an interface.

Further the band may display a live view image through the one of the flexible display panel or the sub-display if the operation mode of the camera is the standby mode.

In accordance with another aspect of the present disclosure, a control method of a wearable device is provided. The control method includes a body including a camera, and a band physically connected to the body and configured to be wearable on a body part of a user, the method including sensing a first user's motion using a plurality of sensors, analyzing the first user's motion based on a sensing value sensed by the plurality of sensors and determining whether or not the first user's motion satisfies an image photographing condition, and photographing an image through the camera if the first user's motion satisfies the image photographing condition.

Further, the image photographic condition may include an acceleration value sensed by a first sensor of the plurality of sensors being equal to or greater than a predetermined critical velocity and an angular variation detected from an angular velocity sensed by a second sensor being equal to or greater than a predetermined critical value.

Further, the control method may further include converting an operation mode of the camera to a standby mode if the acceleration value sensed by the first sensor is equal to or greater than the predetermined critical velocity, wherein the camera may perform auto focusing during the standby mode.

Further, the control method may further include determining whether a second user's motion is sensed within a predetermined critical time after the first user's motion, and if the second user's motion is sensed, determining a direction of movement of the second user's motion and controlling a photographing operation of the camera based on the determined direction of movement, wherein the image photographing condition may include the second user's motion not being sensed within the predetermined critical time.

Further, the controlling may perform a zoom-in photographing operation if the direction of movement of the second user's motion is a first direction of approaching a subject to be photographed, and perform a zoom-out photographing operation if the direction of movement of the second user's motion is a second direction of distancing away from the subject to be photographed.

Further, the controlling may perform a photographing operation related to screen conversion if the direction of movement of the second user's motion is a direction towards a ground.

Further, the controlling may perform a zoom-in/zoom-out photographing operation according to at least one manipulating direction of one of a bezel formed on a rim of the display configured to display time information and a jog dial formed on one side surface of the display.

Further, the band may be configured as one of a flexible display panel or include a sub-display in one region thereof, communicably connected to the body through an interface, and the converting of the operation mode of the camera to the standby mode may include displaying a live view image through the one of the flexible display panel or the sub-display.

As aforementioned, according to the present disclosure, a user can photograph an image more easily and conveniently through the wearable device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B are views illustrating an example of performing a screen conversion according to a user's motion in a wearable device according to various embodiments of the present disclosure;

FIGS. 9A and 9B are views illustrating an example of performing a zoom-in operation according to a user's motion in a wearable device according to various embodiments of the present disclosure;

FIGS. 10A and 10B are views illustrating an example of performing a zoom-out operation according to a user's motion in a wearable device according to various embodiments of the present disclosure;

Throughout the drawings, it should be noted that like reference numbers are used to depict the same or similar elements, features, and structures.

DETAILED DESCRIPTION

Figure 1:
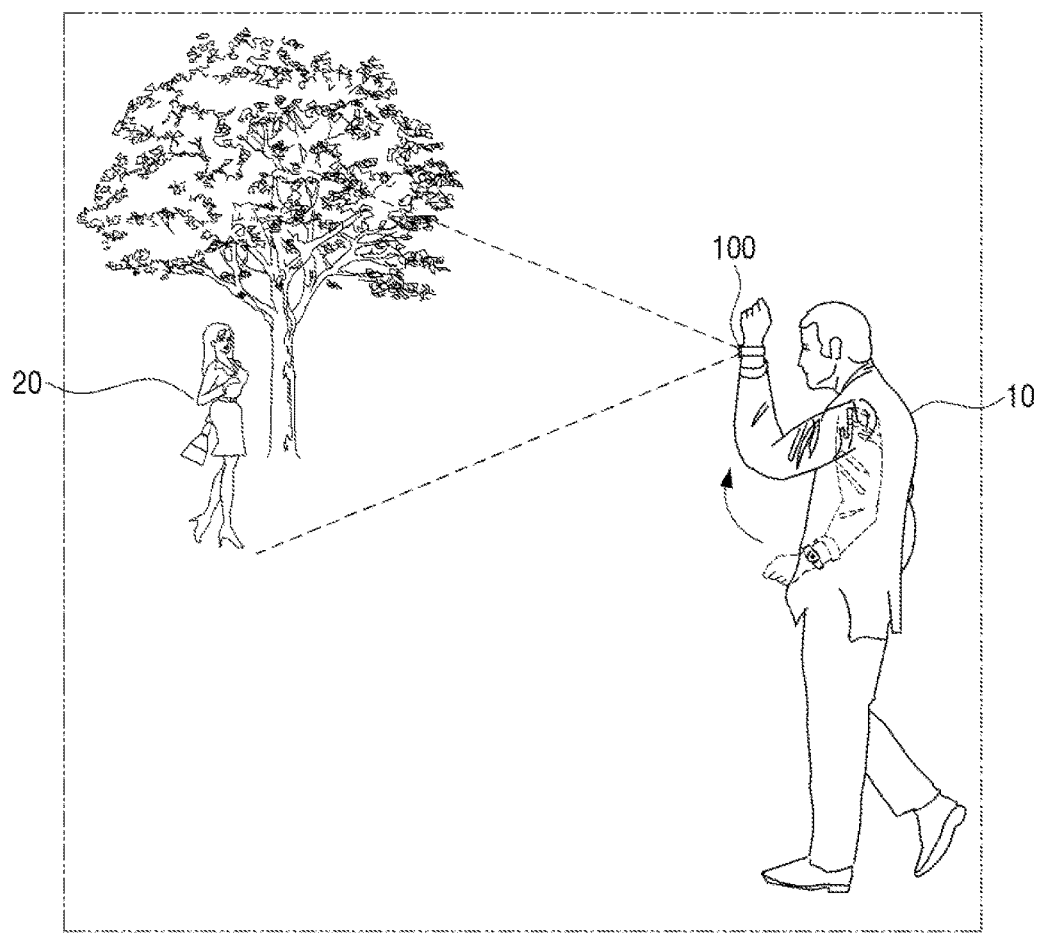
FIG. 1 is a view illustrating an example of how an image is photographed based on a user's motion in a wearable device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, like reference numerals indicate like components that perform substantially the same functions throughout the specification. For the sake of explanation and understanding, different embodiments are described with reference to like reference numerals. That is, even if all the components in the plurality of drawings have like reference numerals, it does not mean that the plurality of drawings refer to only one embodiment.

Further, the terms including numerical expressions such as a first, a second and the like may be used to explain various components, but there is no limitation thereto. These terms are used only for the purpose of differentiating one component from another, without limitation thereto. For example, a numerical expression combined with a component should not limit the order of use or order of arrangement of the component. When necessary, the numerical expressions may be exchanged between components.

A singular expression includes a plural expression unless clearly mentioned otherwise. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

In the embodiments of the present disclosure, terms such as "module", "unit", and "part" and the like are terms used to indicate components that perform at least one function and operation, and these components may be realized in hardware, software or in combination thereof. Further, except for when each of a plurality of "modules", "units", "parts" and the like needs to be realized in an individual hardware, the components may be integrated in at least one module or chip and be realized in at least one processor (not illustrated).

Further, in the embodiments of the present disclosure, when it is described that a portion is connected to another portion, the portion may be either connected directly to the other portion, or connected indirectly via another medium. Further, when it is described that a portion includes another component, it does not exclude the possibility of including other components, that is, the portion may further include other components besides the described component.

Hereinafter, various embodiments of the present disclosure will be explained in detail with reference to the drawings attached.

FIG. 1 is a view of an example of photographing an image based on a user's motion in a wearable device according to an embodiment of the present disclosure.

Referring to FIG. 1, a user 10 wearing the wearable device 100 on his/her wrist may lift his/her arm wearing the wearable device 100 by as much as a certain height in a direction of a subject 20 to be photographed. That is, the user 10 may lift the arm by as much as the certain height such that a direction of a lens of the wearable device 100 heads towards the subject 20 to be photographed.

In this case, the wearable device 100 senses the user 10's motion from the movement of the arm wearing the wearable device 100, and determines from the sensed user 10's motion whether or not it satisfies an image photographing condition.

Specifically, the wearable device 100 may sense an acceleration and an angular velocity from the user 10's motion regarding the movement of the arm wearing the wearable device 100. When the acceleration and the angular velocity are sensed from such a user 10's motion, the wearable device 100 determines whether or not the sensed acceleration value is equal to or greater than a predetermined critical velocity. If it is determined that the sensed acceleration value is equal to or greater than the predetermined critical velocity, the wearable device 100 determines an angular variation from the angular velocity sensed from the user 10's motion, and determines whether or not the detected angular variation is equal to or greater than a predetermined critical value.

If it is determined that the sensed acceleration value is equal to or greater than the predetermined critical velocity and the angular variation detected from the sensed angular velocity is equal to or greater than the predetermined critical value, the wearable device 100 may determine that the user 10's motion is a motion for photographing an image, and perform an image photographing operation on the subject 20 to be photographed.

Hereinabove, the operation of photographing an image of the subject 20 to be photographed according to the user 10's motion in the wearable device 100 according to the present disclosure was roughly explained. Hereinafter, each configuration of the wearable device 100 for performing an image photographing operation on the subject 20 to be photographed according to the user 10's motion will be explained in detail.

Figure 2:
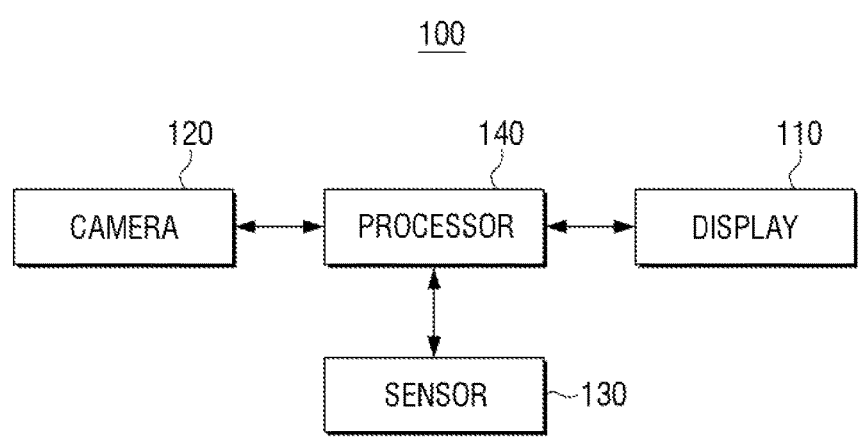
FIG. 2 is a block diagram of a wearable device according to an embodiment of the present disclosure.

FIG. 2 is a block diagram of a wearable device according to an embodiment of the present disclosure.

Figure 3:
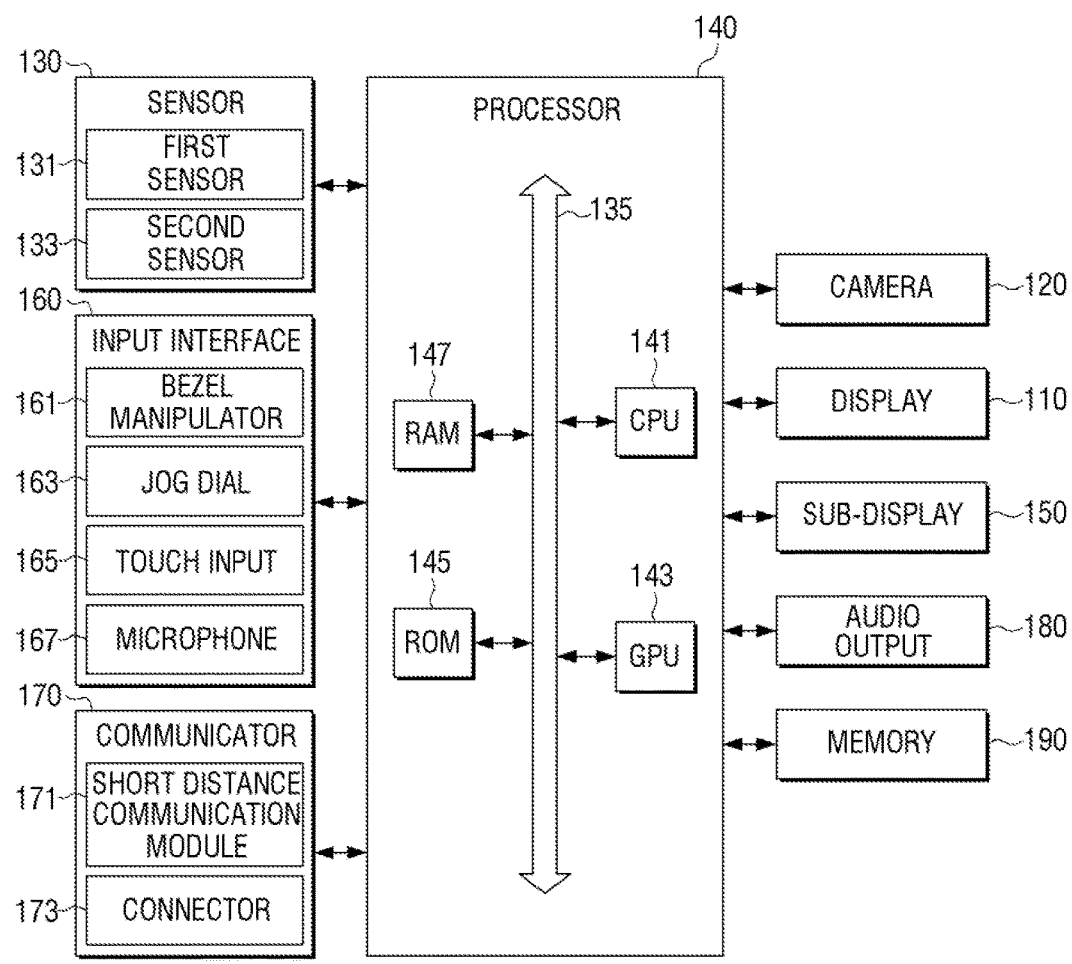
FIG. 3 is a detailed block diagram of a wearable device according to an embodiment of the present disclosure.

FIG. 3 is a detailed block diagram of a wearable device according to an embodiment of the present disclosure.

Referring to FIG. 2, the wearable device 100 may be a device wearable on a user 10's body part, especially, on the user 10's wrist. For example, the wearable device 100 may be a smart watch that can be interlocked with a smart phone.

As will be explained with reference to FIGS. 4A and 4B, such a wearable device 100 includes a body 410 configured to provide time information, and a band 420 that is physically connected to the body 410 and that is wearable on a user 10's body part.

Further, the body 410 of the wearable device 100 includes a display 110, a camera 120, a sensor 130 and a processor 140.

The display 110 displays time information. Not only that, the display 110 may display user interfaces (UIs) of various applications and contents. Such a display 110 may be realized as a liquid crystal display (LCD) and an organic light emitting display (OLED), etc. Not only that, the display 110 may be realized as a touch panel to receive a touch command from the user, regarding the UIs displayed.

Not only that, in the case of providing time information using a needle and a second hand, the display 110 may be made of a glass material.

The camera 120 is a configuration for photographing an image. Here, the image to be photographed may be at least one of a video or a still image. Specifically, when an external light enters from a lens 430 to be explained hereinafter and thus an image is formed on a photographing surface, the camera 120 converts the external light of which the image is formed on the photographing surface into an electrical signal using a photoelectric conversion device such as a charge coupled device (CCD) or a complementary metal oxide semiconductor (CMOS). Therefore, the processor 140 to be explained hereinafter image-processes raw image data of the electrical signal converted through the camera 120 and generates a live view image of the subject to be photographed.

Meanwhile, the aforementioned method for generating a live view image is a technology well known in the field of technology for cameras provided with an electrical view finder or an optical view finder, and thus detailed explanation thereof is omitted herein.

The sensor 130 is a sensor configured to sense a user 10's motion. The sensor 130 may include a first sensor 131 for sensing an acceleration caused by the user's motion and a second sensor 133 for sensing an angular velocity caused by the user's motion.

According to an embodiment, the first sensor 131 may be an accelerometer sensor for measuring the intensity of acceleration or impact caused by the user's motion, and the second sensor 133 may be a gyroscope sensor that is made by applying rotation to a accelerometer sensor so that it can recognize in six axis directions to recognize operations in more detail and precision according to the related art.

Meanwhile, the sensor 130 according to the present disclosure may further include a magnetic sensor, a gravity sensor and the like besides the aforementioned first and second sensors 131, 133.

The processor 140 may analyze the user 10's motion based on a sensing value sensed by the sensor 130 that includes the first and second sensor 131, 133, and when the user 10's motion satisfies an image photographing condition, the processor 140 may control the camera 120 to perform an image photographing.

Specifically, when a first user 10's motion is sensed where an acceleration value sensed by the first sensor 131 is equal to or greater than a predetermined critical velocity and an angular variation detected from an angular velocity sensed by the second sensor 133 is equal to or greater than a predetermined critical value, the processor 140 controls the camera 120 to perform an image photographing.

More specifically, if the acceleration value sensed by the first sensor 131 is equal to or greater than the predetermined critical velocity, the processor 140 controls the camera 120 to convert its operation mode to a standby mode. According to such a control command, the camera 120 may convert its operation mode to the standby mode for image photographing, and perform auto focusing on the subject to be photographed, during the standby mode.

In the state where the operation mode of the camera 120 is converted to the standby mode as aforementioned, if the angular variation detected from the angular velocity sensed by the second sensor 133 is equal to or greater than the predetermined critical value, the processor 140 determines that the user 10's motion is the first user 10's motion for image photographing, and controls the camera 120 to perform an image photographing. Accordingly, the camera 120 may perform the image photographing on the subject 20 that is auto focused.

Meanwhile, when it is determined that the user 10's motion is the first user 10's motion for image photographing, the processor 140 determines whether or not a second user 10's motion is sensed within a predetermined critical time after the first user 10's motion is determined.

If it is determined that a second user 10's motion is not sensed within the predetermined critical time, the processor 140 controls the camera 120 to perform the image photographing on the subject 20 that is auto focused.

Meanwhile, if the second user 10's motion is sensed within the predetermined critical time, the processor 140 determines a direction of movement of the second user 10's motion based on an acceleration value sensed by the first sensor 131, and controls the camera 120 to perform a photographing operation based on the determined direction of movement.

According to an embodiment, the processor 140 controls the camera 120 to perform a zoom-in photographing operation if the direction of movement of the second user 10's motion is a first direction of approaching the subject 20 to be photographed, and to perform a zoom-out operation if the direction of movement of the second user 10's motion is a second direction of distancing away from the subject 20 to be photographed. By such a control command, the camera 120 may perform a zoom-in/zoom-out operation.

Meanwhile, the processor 140 controls the camera 120 to perform a photographing operation related to screen conversion if the direction of movement of the second user 10's motion is a third direction of approaching ground. More specifically, in the case where the direction of movement of the second user 10's motion approaches the ground while maintaining a distance between the subject 20 to be photographed and the wearable device 100, the processor 140 may determine that the direction of the second user 10's motion is the third direction and control the camera 120 to perform a photographing operation related to screen conversion. By such a control command, the camera 120 may perform a screen conversion from vertical photographing to horizontal photographing of the subject 20 to be photographed.

Meanwhile, after the photographing operation of the camera 120 is performed based on the direction of movement of the second user 10's motion, the processor 140 determines whether another user 10's motion is sensed within the predetermined critical time. If it is determined that there is no additional user 10's motion sensed within the predetermined critical time, the processor 140 controls the camera 120 to perform the image photographing. Accordingly, the camera 120 may perform the image photographing on the subject 20 to be photographed based on the photographing operation performed based on the direction of movement of the second user 10's motion.

However, if it is determined that another user 10's motion is sensed within the predetermined critical time, the processor 140 may control the photographing operation of the camera 120 based on the direction of movement of that another user 10's motion sensed.

Meanwhile, as aforementioned, the camera 120 includes a lens 430 for receiving external light, and the lens 430 may be located in a central region 440 of the display 110 as will be explained hereinafter with reference to FIGS. 4A and 4B. Therefore, the display 110 may display time information and various UIs through the rest of the region 450 besides the central region 440 where the lens 430 is located.

Meanwhile, besides the aforementioned configuration, the wearable device 100 may further include a sub-display 150, an input interface 160, a communicator 170, an audio output 180 and a memory 190 as illustrated in FIG. 3.

Together with the aforementioned display 110, the sub-display 150 displays various UIs. Not only that, the sub-display 150 may display a live view image of the subject 20 to be photographed, an image photographed from the displayed live view, or a thumb nail of the image. Here, the image photographed from the live view image may include at least one of a video and a still image.

According to an embodiment, such a sub-display 150 may be included in one region of the aforementioned band 420, and may be communicably connected with the body 410 through an interface.

According to another embodiment, in the case where the aforementioned band 420 is realized as a flexible display panel, the sub-display 150 may be the band 420 realized as a flexible display panel.

The input interface 160 that receives a user command includes a bezel manipulator 161, a jog dial 163, a touch input 165 and a microphone 167.

As will be explained hereinafter with reference to FIGS. 4A and 4B, the bezel manipulator 161 is formed on a rim of the display 110, and may receive a user command through a left/right rotation, and the jog dial 163 may be formed on one side surface of the display 110 and receive the user command through a left/right rotation or push manipulation.

Therefore, when a user command by a left/right rotation is received through at least one of the bezel manipulator 161 and the jog dial 163, the processor 140 controls the camera 120 to perform a zoom-in/zoom-out photographing operation according to a manipulating direction corresponding to the input user command. Therefore, in order to perform the zoom-in/zoom-out photographing operation regarding the subject 20 to be photographed according to the at least one manipulating direction of the bezel manipulator 161 and the jog dial 163, the camera 120 may move the lens 430 or the display 110 up and down.

In the case where at least one of the aforementioned display 110 and the sub-display 150 is realized as a touch screen form, the touch input 165 may be realized as a touch pad forming a mutual layered structure with at least one of the display 110 and the sub-display 150.

The microphone 167 receives input of a voice command for controlling operations of the wearable device 100 or an uttered voice for performing voice communication with another electronic device (not illustrated).

The communicator 170 is for performing data communication in the wearable device 100, and may include a short distance communication module 171.

The short distance communication module 171 is a configuration for performing short distance communication wirelessly between the wearable device 100 and a display device (not illustrated) such as a smart phone. Such a short distance communication module 171 may include at least one of a Bluetooth (BT) module, an infrared data association (IrDA) module, a near field communication (NFC) module, a wireless fidelity (WI-FI) module, and a Zigbee module.

Therefore, the processor 140 may transmit image data photographed in the wearable device 100 or voice data regarding the user 10's uttered voice or the like to the electronic device (not illustrated) such as a smart phone communicably connected to the wearable device 100 through the short distance communication module 171.

Not only that, the communicator 170 may further include a connector 173. The connector 173 may transmit/receive contents-related data to and from the electronic device (not illustrated) such as a smart phone, or transmit pre-stored contents data to an external record medium through a wire cable connected to the connector 173. Further, the connector 173 may receive input of power from a power source through the wire cable physically connected to the connector 173.

The audio output 180 outputs signal-processed audio data as an audio signal through a speaker, and the memory 190 stores execution programs regarding various UIs and image data and the like photographed through the camera 120. Not only that, the memory 190 may further store an operating system for controlling operations of the wearable device 100.

Here, the operating program may be a program that is read in the memory 190 when the wearable device 100 is turned-on, and compiled to operate each configuration of the wearable device 100. Such a memory 190 may be realized in at least one of a read only memory (ROM), a random access memory (RAM), a memory card attachable/detachable to and from the wearable device 100 (for example, secure digital (SD) card and memory stick), a non-volatile memory, a volatile memory, a hard disk drive (HDD) and a solid state drive (SSD).

Meanwhile, the aforementioned processor 140 may include a central processing unit (CPU) 141, a graphics processing unit (GPU) 143, a ROM 145 and a RAM 147, and the CPU 141, the GPU 143, the ROM 145 and the RAM 147 may be connected to each other through a bus 135.

The CPU 141 accesses the memory 190 and performs booting using an operating system (OS) stored in the memory 190. Further, the CPU 141 performs various operations using various programs, contents, data and the like stored in the memory 190.

The GPU 143 generates a display screen that includes various objects such as an icon, an image and a text, etc. Specifically, the GPU 143 may compute an attribute value such as a coordinate value, a form, a magnitude, a color and the like for displaying each object according to a layout of the screen based on the received control command, and generate display screens of various layouts including the object based on the computed attribute value.

In the ROM 145, a command set and the like for system booting is stored. When a turn-on command is input and power is supplied, the CPU 141 copies the OS stored in the memory 190 according to the command stored in the ROM 145, and executes the OS to boot the system. When the booting is completed, the CPU 141 copies various programs stored in the memory 190 in the RAM 147, and executes the programs copied in the RAM 147 to perform various operations.

Such a processor 140 may be combined with the various aforementioned configurations and be realized as a system-on-a-chip (SOC) or system on chip (SoC).

Figure 4A:
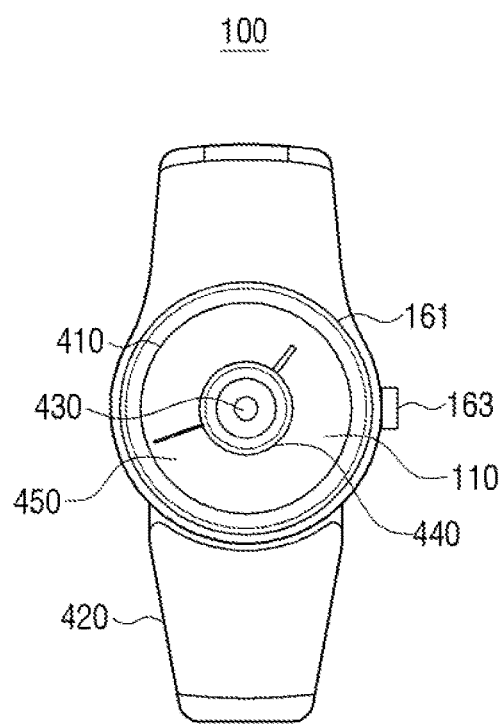
FIGS. 4A and 4B are views illustrating an example of a wearable device according to various embodiments of the present disclosure.
Figure 4B:
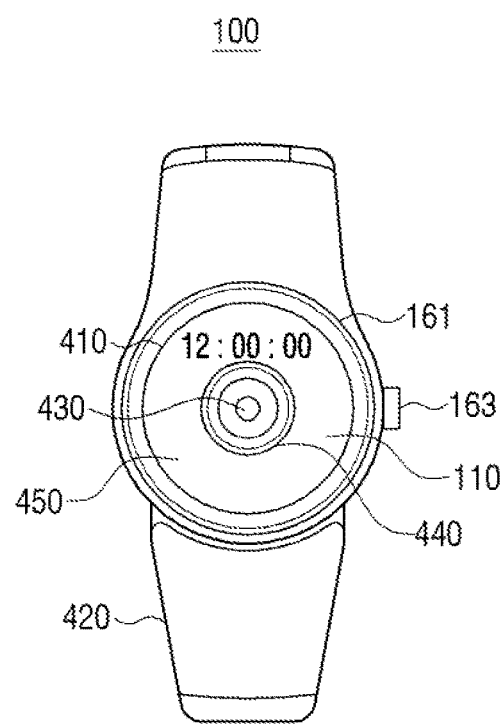

FIGS. 4A and 4B are views illustrating an example of a wearable device according to various embodiments the present disclosure.

The wearable device 100 illustrated in FIG. 4A shows how time information is provided in an analogue form that includes a needle and a second hand through the display 110 formed on a front surface of the body 410. In this case, the display 110 may be made of a glass material.

Further, the wearable device 100 illustrated in FIG. 4B shows how time information is provided in a digital form through the display 110 formed on a front surface of the body 410. In this case, the display 110 may be realized as a display panel where touch input can be made.

Such a wearable device 100 illustrated in FIGS. 4A and 4B include a body 410 for providing time information, and a band 420 that is physically connected with the body 410 and wearable on the user 10's wrist.

Meanwhile, the front surface of the body 410 may consist of the display 110 providing at least one of the time information and various UIs as aforementioned, and in a central region of the display 110, a lens 430 is formed. The lens 430 formed in the central region of the display 110 may be a barrel lens that protrudes externally to perform zoom-in/zoom-out photographing operations or an inner lens that does not protrude externally to perform zoom-in/zoom-out photographing operations.

Meanwhile, in a rim region of the display 110, there is provided a bezel manipulator 161 for receiving input of a user command regarding a zoom-in/zoom-out operation of the lens 430 formed in the central region of the display 110. Further, on one side surface of the body 410, there is provided a jog dial 163 for receiving input of the user command regarding the zoom-in/zoom-out operation of the lens 430 formed in the central region of the display 110.

Meanwhile, the bezel manipulator 161 and the jog dial 163 according to the present disclosure may not only receive input of the user command regarding the zoom-in/zoom-out operation of the lens 430 formed in the central region 440 of the display 110 but may also receive a user command regarding various UIs displayed.

Figure 5:
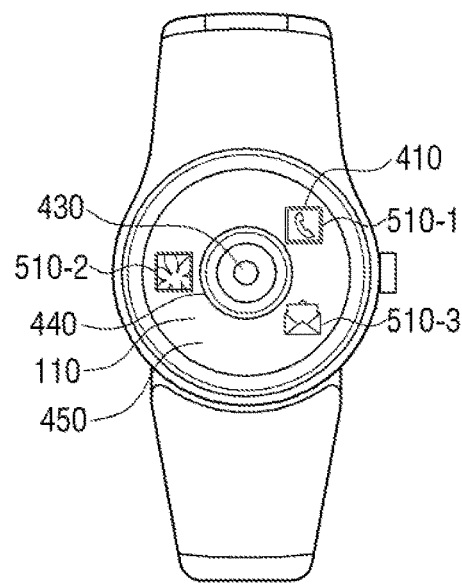
FIG. 5 is a view illustrating an example of a body of a wearable device according to an embodiment of the present disclosure.

FIG. 5 is a view illustrating an example of a body of a wearable device according to an embodiment of the present disclosure.

As aforementioned, on the front surface of the body 410 of the wearable device 100, time information is provided, and in the central region, the display 110 including the lens 430 for photographing a subject 20 to be photographed is formed. Meanwhile, as explained with reference to FIG. 4B, in the case where the display 110 is realized as a display panel where a touch input can be made, the display 110 may be realized as a display panel where a touch input can be made in the rest of the region 450 besides the central region 440 where the lens 430 is formed.

Therefore, the display 110 may display icons 510-1 to 510-3 each corresponding to each of the time information and UIs through the rest of the region besides the central region where the lens 430 is formed. Therefore, in a state where the plurality of icons 510-1 to 510-3 are displayed through the display 110, when a user command is input from at least one of the bezel manipulator 161 and the jog dial 163, the wearable device 100 may perform execution of the icon of the plurality of icons 510-1 to 510-3, corresponding to the user command input.

Figure 6:
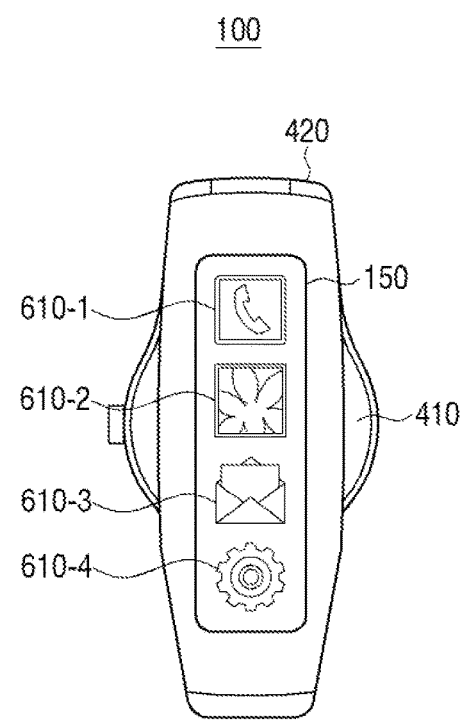
FIG. 6 is a first view of a band of a wearable device according to an embodiment of the present disclosure.

FIG. 6 is a first view of a band of a wearable device according to an embodiment of the present disclosure.

Referring to FIG. 6, the band 420 that is physically connected to the body 410 of the wearable device 100 and that is wearable on the user 10's wrist may include a sub-display 150. The sub-display 150 may be connected to the body 410 through an interface included in the band 420.

Therefore, the sub-display 420 may display icons 610-1 to 610-4 each corresponding to each of the UIs on the display screen according to a control command of the processor 140. That is, the processor 140 may control such that the icons 610-1 to 610-4 each corresponding to each of the UIs can be displayed through at least one of the display 110 and the sub-display 150, according to the user command.

According to an embodiment, the processor 140 may control such that icons that are frequently used or that correspond to UIs pre-stored by the user 10 can be displayed on the display 110 and that the rest of the icons can be displayed on the sub-display 150.

Meanwhile, the sub-display 420 may not only display the icons 610-1 to 610-4 each corresponding to each of the UIs on the screen, but may also display a live view image or a photographed image of the subject 20 to be photographed by the camera 120, or a thumbnail image of the photographed image.

Figure 7:
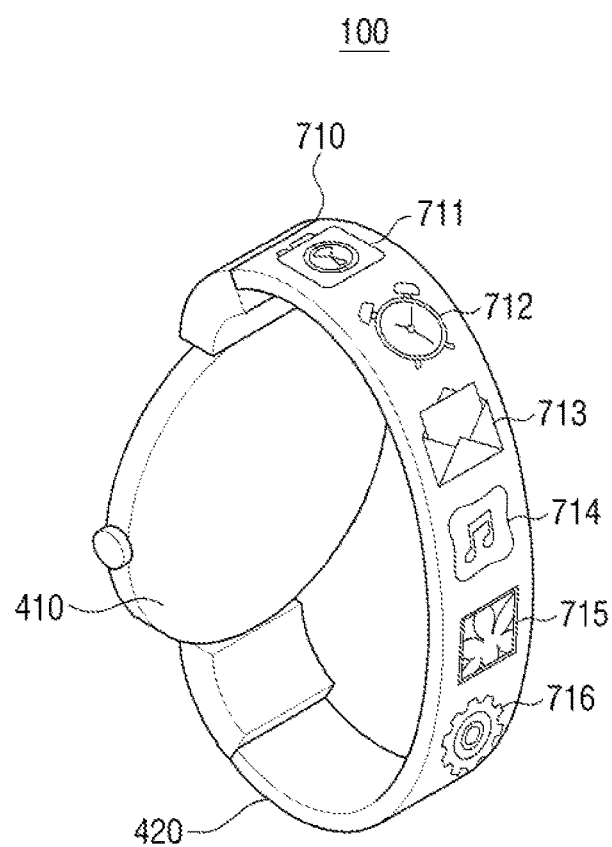
FIG. 7 is a second view of a band of a wearable device according to another embodiment of the present disclosure.

FIG. 7 is a second view of a band of a wearable device according to another embodiment of the present disclosure.

Referring to FIG. 7, the band 420 that is physically connected to the body 410 of the wearable device 100 and that is wearable on the user 10's wrist may be realized as a flexible display 710.

In the case where the band 420 is realized as the flexible display 710 as aforementioned, the flexible display 710 may display on the screen icons 711 to 716 each corresponding to each of the UIs. Meanwhile, when the live view image on the subject 20 to be photographed or the image photographed by the camera 120 is generated, the flexible display 710 may display at least one of the plurality of icons 711 to 716 in one region, and display the live view image or the photographed image in the rest of the region.

Hereinafter, explanation will be made in detail on how the photographing operation of the camera 120 is performed according to a user 10's motion in a wearable device 100 according to the present disclosure.

FIGS. 8A and 8B are views illustrating an example of performing screen conversion according to a user's motion in a wearable device according to various embodiments of the present disclosure.

As aforementioned, the user 10 may conduct a motion of lifting his/her arm wearing the wearable device 100 to or above a certain height. According to an embodiment, the user 10 may conduct a motion of lifting the arm wearing the wearable device 100 to his/her eyelevel.

When such a user 10's motion occurs, the wearable device 100 obtains a sensing value according to the user 10's motion sensed by a first and a second sensor 131, 133, and determines based on the obtained sensing value whether or not the user 10's motion is a motion for image photographing.

If an acceleration value sensed by the first sensor 131 as aforementioned is equal to or greater than a predetermined critical velocity, the processor 140 of the wearable device 100 controls the camera 120 to convert its operation mode to the standby mode. Accordingly, the camera 120 converts its operation mode to the standby mode for image photographing, and performs auto focusing on the subject to be photographed, during the standby mode.

When the operation mode of the camera 120 is converted to the standby mode as aforementioned, the sub-display 150 displays an auto focused live view image of the subject 20 to be photographed.

In the state where the operation mode of the camera 120 is converted to the standby mode for image photographing as aforementioned, the processor 140 of the wearable device 100 detects an angular variation from an angular velocity sensed by the second sensor 133 and compares the detected angular variation with a predetermined critical value. If the angular variation is equal to or greater than the predetermined critical value as a result of the comparison, the processor 140 determines that the user 10's motion is a first user's motion that satisfies the image photographing condition, and controls the camera 120 to perform an image photographing on the subject 20 to be photographed.

Accordingly, the camera 120 may perform the image photographing on the live view image displayed on the sub-display 150.

Here, the processor 140 determines whether a second user 10's motion is sensed within a predetermined critical time after determining that the user 10's motion is the first user's motion satisfying the image photographing condition.

Referring to FIG. 8A, the user 10 may lift the arm wearing the wearable device 100 to be in accordance to the first user's motion for image photographing. Then, with the arm wearing the wearable device 100 lifted, the user 10 may move the aim in a horizontal direction to the ground while maintaining the distance between the subject 20 to be photographed and the wearable device 100.

When a second user 10's motion is sensed from such a user 10's motion, the processor 140 controls the camera 120 to perform a photographing operation related to screen conversion. Accordingly, the camera 120 performs a photographing operation of converting the screen from a first screen to a second screen, and the sub-display 150 may convert from a live view image corresponding to the first screen to a live view image corresponding to the second screen according to the screen conversion.

Referring to FIG. 8B, in the case where the user 10's motion is the first user's motion for image photographing, the sub-display 150 may display a live view image 810 of a horizontal direction. When a second user's motion related to screen conversion is sensed in the state where such a live view image of the horizontal direction 810 is displayed, the sub-display 150 may convert the screen from the live view image 810 of the horizontal direction to a live view image 820 of a vertical direction.

As aforementioned, the wearable device 100 may display through the sub-display 150 the live view image 810 of the horizontal direction according to the first user's motion of the user or display the live view image 820 of the vertical direction according to the second user's motion. Further, if an additional user's motion is not sensed in the state where the live view image 810, 820 of the horizontal or vertical direction is displayed, the wearable device 100 may photograph an image of the live view image displayed on the screen of the sub-display 150 through the camera 120.

FIGS. 9A and 9B are views illustrating an example of a zoom-in operation according to user's motion in a wearable device according to various embodiments of the present disclosure.

Referring to FIGS. 8A and 8B, the processor 140 may determine whether a second user's motion is sensed within the predetermined critical time after it is determined that the user 10's motion is the first user's motion satisfying the image photographing condition.

Referring to FIG. 9A, the user 10 may lift the arm wearing the wearable device 100 to be in accordance with the first user's motion for image photographing. Then, with the arm wearing the wearable device 100 lifted, the user 10 may lift the arm to approach the subject 20 to be photographed.

When a second user's motion is sensed from such a user 10's motion, the processor 140 controls the camera 120 to perform a zoom-in related photographing operation. Accordingly, the camera 120 protrudes the lens 430 located in the central region of the display 110 (see, e.g., FIG. 4A) to perform a zoom-in operation regarding the subject 20 to be photographed. Accordingly, the sub-display 150 may display a live view image 910 expanded to a magnitude corresponding to the zoom-in operation.

Referring to FIG. 9B, in the case where the user 10's motion is a first user's motion for image photographing, the sub-display 150 may display a first live view image 910. When a zoom-in related second user's motion is sensed in the state where such a first live view image 910 is displayed, the sub-display 150 may display an expanded second live view image 920 of the first live view image 910.

As aforementioned, the wearable device 100 may display the expanded second live view image 920 through the sub-display 150 according to the zoom-in related second user's motion, and if an additional user 10's motion is not sensed in the state where the second expanded live view image 920 is displayed, the wearable device 100 may photograph an image of the corresponding live view image 920 through the camera 120.

FIGS. 10A and 10B are views illustrating an example of a zoom-out operation according to a user's motion in a wearable device according to various embodiments of the present disclosure.

Referring to FIGS. 10A and 10B, the sub-display 150 may display a live view image 1010 expanded according to a zoom-in related second user's motion. In the state where such an expanded live view image 1010 is being displayed, as illustrated in FIG. 10A, the user 10 may move the arm wearing the wearable device 100 to distance the wearable device 100 away from the subject 20 to be photographed.

When a second user's motion is sensed from such a user 10's motion, the processor 140 controls the camera 120 to perform a zoom-out related photographing operation. Accordingly, the camera 120 controls such that a zoom-out operation of the lens 430 located in the central region of the display 110 (see, e.g., FIG. 4A) can be performed. Accordingly, the lens 430 that had been protruding externally for the zoom-in operation performs an operation of being inserted back into the body 410 according to a zoom-out control command. Accordingly, the sub-display 150 may convert from displaying a live view image 1010 expanded to a magnitude corresponding to the zoom-in operation to displaying a live view image 1020 reduced to a magnitude corresponding to the zoom-out operation.

Referring to FIG. 10B, the sub-display 150 may convert from displaying the first live view image 1010 that had been expanded to a magnitude corresponding to the zoom-in operation to displaying the second live view image 1020 reduced to a magnitude corresponding to the zoom-out operation.

As aforementioned, the wearable device 100 may display through the sub-display 150 the live view image reduced according to the zoom-out related second user's motion, and if an additional user's motion is not sensed in the state where the reduced live view image 1020 is displayed, the wearable device 100 may photograph an image of the corresponding live view image 1020 through the camera 120.

Hereinafter, explanation will be made in detail on an operation of performing a zoom-in/zoom-out operation on an image to be photographed according to a user command in the wearable device 100.

Figure 11:
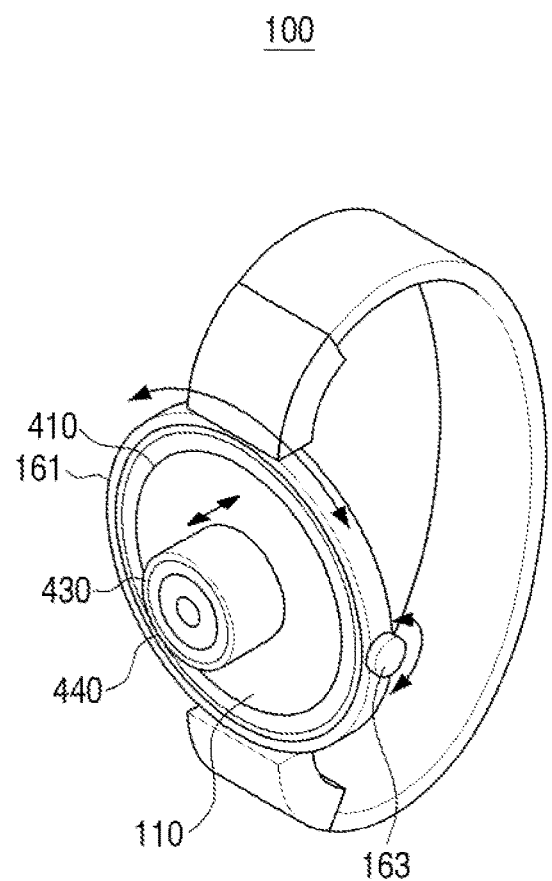
FIG. 11 is a first view of performing a zoom-in/zoom-out operation in a wearable device according to an embodiment of the present disclosure.

FIG. 11 is a view of performing a zoom-in/zoom-out operation in a wearable device according to an embodiment of the present disclosure.

Figure 12:
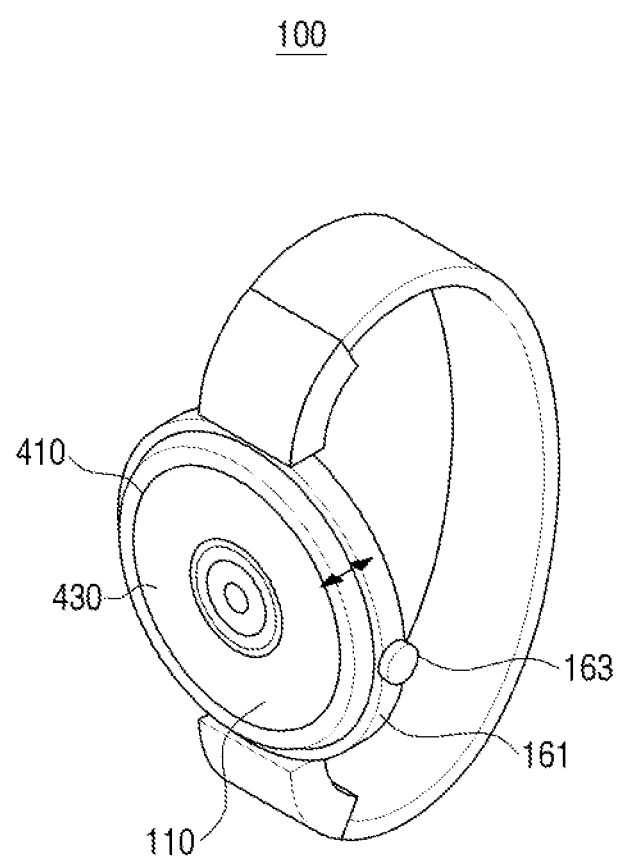
FIG. 12 is a second view of performing a zoom-in/zoom-out operation in a wearable device according to an embodiment of the present disclosure.

FIG. 12 is a second view of performing a zoom-in/zoom-out operation in a wearable device according to an embodiment of the present disclosure.

Referring to FIG. 11, on the front surface of the body 410 in the wearable device 100, there is provided a display 110 for providing time information and various UI related icons, and a lens 430 is formed in the central region 440 of the display 110. Further, in a rim region of the display 110, a bezel manipulator 161 is formed, and on one side surface of the body 410, a jog dial 163 is formed.

Meanwhile, in the case where the type of the lens 430 formed in the central region 440 of the display 110 is a barrel lens, the lens 430 may protrude externally and perform a zoom-in/zoom-out operation. That is, the lens 430 may protrude externally or be inserted into the body 410 based on a manipulating direction of the bezel manipulator 161 and the jog dial 163.

Specifically, if at least one manipulating direction of the bezel manipulator 161 and the jog dial 163 is a first direction, the lens 430 performs a zoom-in operation of protruding externally. Meanwhile, if the at least one manipulating direction of the bezel manipulator 161 and the jog dial 163 is a second direction that is opposite to the first direction, the lens 430 that had been protruding externally performs a zoom-out operation of being inserted into the body 410.

Referring to FIG. 12, the display 110 that includes the lens 430 performs a zoom-in/zoom-out operation according to at least one manipulating direction of the bezel manipulator 161 and the jog dial 163.

Specifically, if the at least one manipulating direction of the bezel manipulator 161 and the jog dial 163 is the first direction, the display 110 that includes the lens 430 performs a zoom-in operation of protruding externally. Meanwhile, if the at least one manipulating direction of the bezel manipulator 161 and the jog dial 163 is the second direction that is opposite to the first direction, the display 110 that had been protruding externally performs a zoom-out operation of being inserted into the body 410.

So far, explanation was made in detail on operations of photographing an image in a wearable device 100 according to the present disclosure. Hereinafter, explanation will be made in detail on a method for photographing an image according to a user's mode in a wearable device 100 of the present disclosure.

Figure 13:
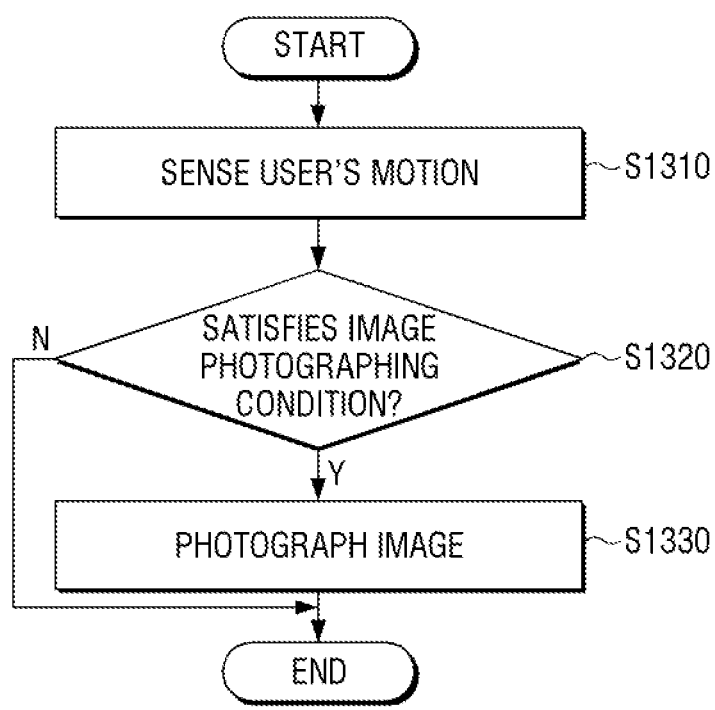
FIG. 13 is a flowchart illustrating a control method of a wearable device according to an embodiment of the present disclosure.

FIG. 13 is a flowchart of a control method of a wearable device according to an embodiment of the present disclosure.

Referring to FIG. 13, the wearable device 100 senses a user's motion using a plurality of sensors at operation S1310. Here, the wearable device 100 may be an electronic device such as a smart watch. Specifically, such a wearable device 100 may include a body that includes a camera for photographing an image and a band that is physically connected to the body and that is wearable on a user's body part.

Such a wearable device 100 senses a user's motion through the plurality of sensors, and analyzes the user's motion based on a sensing value sensed by the plurality of sensors to determine whether the user's motion satisfies an image photographing condition at operation S1320.

If it is determined that the user's motion satisfies the image photographing condition, the wearable device 100 performs an image photographing of the subject to be photographed through the camera at operation S1330.

Hereinafter, explanation will be made in detail on a method for performing a photographing operation according to a sensed user's motion in a wearable device 100 according to the present disclosure.

Figure 14:
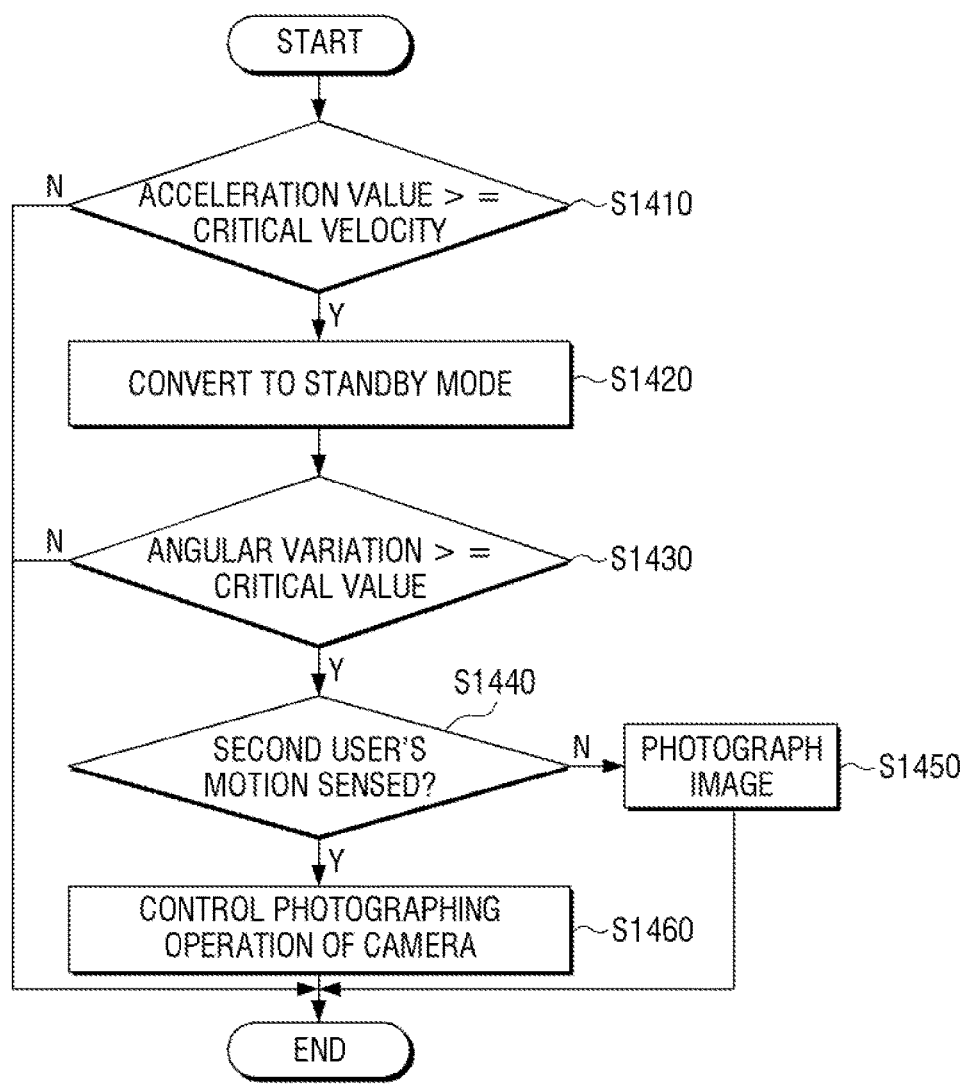
FIG. 14 is a flowchart illustrating a method for performing a photographing operation according to a user's motion in a wearable device according to an embodiment of the present disclosure.

FIG. 14 is a flowchart of a method for performing a photographing operation according to a user's motion in a wearable device according to an embodiment of the present disclosure.

Referring to FIG. 14, when a user's motion is sensed using the plurality of sensors, the wearable device 100 compares an acceleration value sensed by a first sensor of the plurality of sensors with a predetermined critical velocity at operation S1410.

If the acceleration value sensed by the first sensor is equal to or greater than the predetermined critical velocity as a result of the comparison, the wearable device 100 converts the operation mode of the camera for image photographing to the standby mode at operation S1420. Accordingly, the camera converts the operation mode to the standby mode for image photographing, and performs auto focusing on the subject to be photographed during the standby mode.

In such a state where the operation mode of the camera for image photographing is converted to the standby mode, the wearable device 100 detects an angular variation from an angular velocity sensed by a second sensor of the plurality of sensors, and compares the detected angular variation with a predetermined critical value at operation S1430.

If it is determined that the detected angular variation is equal to or greater than the predetermined critical value as a result of the comparison, the wearable device 100 determines that the user's motion is a first user's motion for image photographing. When it is determined that the user's motion is the first user's motion, the wearable device 100 determines whether or not a second user's motion is sensed within a predetermined critical time after determining that the user's motion is the first user's motion at operation S1440. If it is determined that a second user's motion is not sensed within the predetermined critical time, the wearable device 100 performs an image photographing on the subject to be photographed at operation S1450.

Meanwhile, if it is determined that a second user's motion is sensed within the predetermined critical time after determining the user's motion as the first user's motion, the wearable device 100 determines a direction of movement of the sensed second user's motion, and controls a photographing operation of the camera based on the determined direction of movement at operation S1460.

According to an embodiment, if the direction of movement of the second user's motion sensed is a first direction of approaching the subject to be photographed, the wearable device 100 performs a zoom-in photographing operation, and if the direction of movement of the second user's motion is a second direction of distancing away from the subject to be photographed, the wearable device 100 controls the photographing operation of the camera to perform a zoom-out photographing operation. According to such a control command, the camera may perform a zoom-in/zoom-out operation of the lens.

Meanwhile, if the direction of movement of the second user's motion sensed is a third direction of approaching the ground, the wearable device 100 controls the photographing operation of the camera to perform a photographing operation related to screen conversion. According to such a control command, the camera may perform a screen conversion from a screen for image photographing in a horizontal direction to a screen for image photographing in a vertical direction.

Having controlled the photographing operation of the camera based on such direction of movement of the second user's motion, the wearable device 100 determines whether another user's motion is sensed within a predetermined critical time after the second user's motion. If it is determined that an additional user's motion is not sensed within the predetermined critical time, the camera photographs an image based on the photographing operation performed based on the direction of movement of the second user's motion.

The aforementioned method for photographing an image based on a user's motion in the wearable device 100 may be realized as at least one execution program for photographing an image based on the aforementioned user's motion, and such an execution program may be stored in a non-transitory computer readable medium.

The non-transitory computer readable medium is a computer readable medium that stores data semi-permanently unlike one that stores data for a short period of time such as a register, a cache and a memory, etc. Specifically, the aforementioned programs may be stored in various types of computer readable record medium such as a RAM, a flash memory, a ROM, an erasable programmable ROM (EPROM), an electronically erasable and programmable ROM (EEPROM), a register, a hard disk, a removable disk, a memory card, a universal serial bus (USB) memory and a compact disc ROM (CD-ROM), etc.

While the present disclosure has been shown and described with reference to various embodiments thereof, it will be understood by those skilled in the art that various changes in form and details may be made therein without departing from the spirit and scope of the resent disclosure as defined by the appended claims and their equivalents.

What is claimed is:

1. A wearable device comprising:
 a display;
 a camera;
 a plurality of sensors configured to sense a motion of the wearable device; and
 a processor configured to:
  control the display to display time information, and
  control the camera to photograph an image if the motion sensed by the plurality of sensors satisfies an image photographing condition,
 wherein the plurality of sensors comprises:
  a first sensor configured to sense an acceleration caused by the motion of the wearable device; and
  a second sensor configured to sense an angular velocity caused by the motion of the wearable device, and
 wherein the processor controls the camera to photograph the image if an acceleration value sensed by the first sensor is equal to or greater than a predetermined critical velocity and an angular variation detected from the angular velocity sensed by the second sensor is equal to or greater than a predetermined critical value.

2. The wearable device according to claim 1,
 wherein the processor is further configured to control the camera to convert an operation mode of the camera to a standby mode if the acceleration value sensed by the first sensor is equal to or greater than the predetermined critical velocity, and
 wherein the camera performs auto focusing during the standby mode.

3. The wearable device according to claim 1,
 wherein, if a second motion is sensed within a predetermined critical time after the motion satisfying the image photographing condition, the processor is further configured to:
  identify a direction of movement of the second motion based on the acceleration value sensed by the first sensor, and
  perform a photographing operation based on the determined direction of movement.

4. The wearable device according to claim 3, wherein the processor is further configured to:
 control the camera to perform a zoom-in photographing operation if the direction of movement of the second motion is a first direction of approaching a subject to be photographed, and
 control the camera to perform a zoom-out photographing operation if the direction of movement of the second motion is a second direction of distancing away from the subject to be photographed.

5. The wearable device according to claim 3, wherein the processor is further configured to control the camera to perform a photographing operation related to screen conversion if the direction of movement of the second motion is a direction towards a ground.

6. The wearable device according to claim 1,
 wherein the camera comprises a lens, and
 wherein the lens is located in a central region of the display.

7. The wearable device according to claim 6, further comprising:
 an input interface configured to receive input of a user command,
 wherein the input interface comprises:
  a bezel manipulator formed on a rim of the display; and
  a jog dial formed on one side surface of the display, and
 wherein the processor is further configured to control the camera to perform a zoom-in/zoom-out photographing operation according to at least one manipulating direction of one of the bezel manipulator and the jog dial.

8. The wearable device according to claim 7, wherein the camera moves the lens or the display up and down according to a control command regarding the zoom-in/zoom-out photographing operation.

9. The wearable device according to claim 6, wherein the display displays at least one of the time information and a plurality of contents user interfaces (UIs) on a region of the display other than the central region where the lens is located.

10. The wearable device according to claim 1, further comprising:
 a body comprising the display, the plurality of sensors, and the processor; and
 a band that is physically connected with the body and configured to be wearable on a body part of a user,
 wherein the band comprises one of a flexible display panel or includes a sub-display in one region thereof, and
 wherein the one of the flexible display panel or the sub-display is communicably connected to the body through an interface.

11. The wearable device according to claim 10, wherein the band displays a live view image through the one of the flexible display panel or the sub-display, if an operation mode of the camera is a standby mode.

12. A control method of a wearable device comprising a body including a camera, and a band physically connected to the body and configured to be wearable on a body part of a user, the control method comprising:
 sensing a motion of the wearable device using a plurality of sensors; and
 in response to the motion satisfying an image photographing condition, photographing an image through the camera,
 wherein the image photographing condition comprises an acceleration value sensed by a first sensor of the plurality of sensors being equal to or greater than a predetermined critical velocity and an angular variation detected from an angular velocity sensed by a second sensor of the plurality of sensors being equal to or greater than a predetermined critical value.

13. The control method according to claim 12, further comprising:
 converting an operation mode of the camera to a standby mode if the acceleration value sensed by the first sensor is equal to or greater than the predetermined critical velocity,
 wherein the camera performs auto focusing during the standby mode.

14. The control method according to claim 12, further comprising:

if a second motion is sensed within a predetermined critical time after the motion satisfying the image photographing condition, controlling a photographing operation of the camera based on a direction of movement of the second motion, wherein the image photographing condition further comprises the second motion not being sensed within the predetermined critical time.

15. The control method according to claim 14, wherein the controlling of the photographing operation of the camera comprises:

performing a zoom-in photographing operation if the direction of movement of the second motion is a first direction of approaching a subject to be photographed, and performing a zoom-out photographing operation if the direction of movement of the second motion is a second direction of distancing away from the subject to be photographed.

16. The control method according to claim 14, wherein the controlling of photographing operation of the camera comprises performing a photographing operation related to screen conversion if the direction of movement of the second motion is a direction towards a ground.

17. The control method according to claim 14, wherein the controlling of the photographing operation of the camera comprises performing a zoom-in/zoom-out photographing operation according to at least one manipulating direction of one of a bezel formed on a rim of a display configured to display time information and a jog dial formed on one side surface of the display.

18. The control method according to claim 13, wherein the band is configured as one of a flexible display panel or includes a sub-display in one region thereof, and the one of the flexible display panel or the sub-display is communicably connected to the body through an interface, and wherein the converting of the operation mode of the camera to the standby mode comprises displaying a live view image through the one of the flexible display panel or the sub-display.

* * * * *